United States Patent [19]
Mix et al.

[11] Patent Number: 5,234,779
[45] Date of Patent: Aug. 10, 1993

[54] BATTERY HAVING A RETAINER PLATE FOR HOLDING THE CELL ELEMENTS

[75] Inventors: Renard E. Mix, Yorktown; George W. Brutchen, Winchester; Tony E. Key, Yorktown, all of Ind.

[73] Assignee: General Motors Corporation, Detroit, Mich.

[21] Appl. No.: 929,855

[22] Filed: Aug. 17, 1992

[51] Int. Cl.⁵ .............................................. H01M 2/10
[52] U.S. Cl. .................................. 429/186; 429/210
[58] Field of Search ................ 429/186, 210, 66, 162, 429/163, 161, 160, 158, 175, 177

[56] References Cited

U.S. PATENT DOCUMENTS

| | | | |
|---|---|---|---|
| 1,958,186 | 5/1934 | Dietrich | 429/186 |
| 2,205,992 | 6/1940 | Phillips | 429/186 |
| 3,167,456 | 1/1965 | Schilke et al. | 429/210 |
| 4,276,361 | 6/1981 | Boudrot et al. | 429/186 |
| 5,106,708 | 4/1992 | Bish et al. | 429/160 |

Primary Examiner—Anthony Skapars
Attorney, Agent, or Firm—Lawrence B. Plant

[57] ABSTRACT

In an electric storage battery having cell elements including compressed fibrous interelectrode separators, a retainer plate engaging the walls of the battery container for holding the cell element under compression.

13 Claims, 4 Drawing Sheets

BATTERY HAVING A RETAINER PLATE FOR HOLDING THE CELL ELEMENTS

This invention relates to batteries containing compressed, glass mat separators and a method of assembling same, and more particularly to multicell, bipolar, gas-recombinant such batteries.

BACKGROUND OF THE INVENTION

Glass mats have been used as separators in Pb-acid storage batteries for many years. One particular such battery is the so-called "gas recombinant" battery. In a gas-recombinant battery (i.e., single or multicell) oxygen generated at one plate moves across the interelectrode gap to the opposite polarity plate and recombines with hydrogen generated thereat. The interelectrode gap is filled with a bibulous, fibrous glass mat which immobilizes the electrolyte and prevents dendrite growth between adjacent plates. One class of separators for such batteries is described in McClelland et al U.S. Pat. No. 3,862,861 and comprises a fibrous glass mat which is unsaturated with electrolyte and has fiber diameters between 0.2 and about 10 microns and a surface area between about 0.1 and 20 square meters/gram of silica.

Multicell bipolar batteries are also well known in the art. They may either be of the conventional or gas-recombinant type and employ either one of two types of bipolar electrodes. The first, or "face-to-face" type of bipolar electrode, utilizes an electrolyte impervious, conductive sheet having a first polarity, electrochemically active material applied (e.g., pasted) onto one face of the sheet and an opposite polarity, electrochemically active material applied to the opposite face of the sheet. These electrodes are stacked in the battery such that the opposite polarity faces of adjacent electrodes oppose each other across an electrolyte-filled gap, and are separated one from the other by an electrolyte-permeable separator. The second, or "side-by-side", type of bipolar electrode for a multicell battery comprises an electrically conductive substrate (e.g., a grid work of conductive wires) having two separate, substantially coplanar, side-by-side electrode portions (hereafter plates) thereon each of which contains an electrochemically active material of opposite polarity to the other. The two opposite polarity plates are electrically connected to each other by an electrically conductive link which comprises a central segment of the shared conductive substrate which is free of electrochemically active material and lies intermediate the two opposite polarity plates and in essentially the same plane as the plates. Such side-by-side bipolar electrodes, and a multicell battery made therefrom, are shown in Schilke et al U.S. Pat. No. 3,167,456, assigned to the assignee of the present invention. Schilke et al's, side-by-side bipolar electrodes are arranged in overlapping fashion so as to form a plurality of cell elements each housed in a separate cell compartment of a container and comprising a stack of the positive and negative polarity plates of different bipolar electrodes alternately interleaved one with the other. The bipolar electrodes are arranged such that the first polarity plate of each bipolar electrode resides in one compartment and the opposite polarity plate of the same bipolar electrode resides in an adjacent cell compartment in the fashion depicted in FIG. 1 hereof. Conductive links extending between adjacent compartments electrically link the opposite polarity plates together and form the battery's intercell connectors. A more modern version of such a battery is shown in Bish et al U.S. Pat. No. 5,106,708, assigned to the assignee of the present invention.

Assembling gas-recombinant batteries (i.e., conventional or bipolar) is a problem because the glass mats are very resilient and are typically compressed about 25% to about 30% during assembly of the cell element. The cell element must be held in this compressed state during and after assembly into the container. Typically compressive pressures of about 8 psi to about 12 psi are required to compress such a stack depending on the exact density of the mat and degree of compression. Of course, the stack exerts a similar back pressure or expansive force as the stack seeks to return to an unstressed (i.e., uncompressed) state. This problem is even more acute when assembling multicell, bipolar batteries of the type described in Bish et al U.S. Pat. No. 5,106,708 where this force tending to expand the element is exerted upon the cover. One technique that has been proposed for such cells is to stack the plates and separators loosely in their cell compartments, lay the battery cover atop the stack, and apply pressure to the cover to compress the stacks and hold them compressed until the cover is secured to the container. This approach has disadvantages however. In this regard, containers and covers are preferably made from thermoplastic materials which are heat-sealed together by locally heating both pieces, pressing them together and allowing the joint to cool and bond the container and cover together. When the cover is used to hold the glass mats compressed during heat sealing, compressive force must be maintained on the cover throughout the cooling stage else the spring-like expansive force of the compressed glass tends to push the cover off of the container while the heat-sealed joint is till hot and soft.

It is the principal object of the present invention to provide a battery and method of assembling wherein compressed fibrous mat separators are compressed and maintained undercompression by a discrete retainer which prevents the expansion forces of the cell element stack from dislocating the battery cover from the battery container. This and other objects and advantages will become more readily apparent from the detailed description thereof which follows.

BRIEF DESCRIPTION OF THE INVENTION

The present invention involves improvements to batteries having fibrous glass mat separators, and the method of assembling same. The invention comprehends the use of a retainer plate which compresses the cell element in the container and engages recesses in the container walls to hold the element in the compressed state and prevent it from rebounding and dislodging the battery cover from the container.

While the invention is applicable to single cell batteries, it is more particularly applicable to "side-by-side" bipolar electrode-type batteries of the type described in Bish et al (supra). Accordingly, the invention will be discussed in detail hereafter in the context of such Bish et al type bipolar batteries. Such batteries comprise: a container having a plurality of walls defining a plurality of individual cell element compartments; a galvanic cell element in each of the cell compartments comprising a stack of positive and negative polarity plates alternately interleaved one with the other and separated one from the other by a bibulous fibrous mat separator; a cover for the container lying in a plane parallel to the principal planes of the plates; and an opening or passage in an intercell partition/wall separating adjacent cell compartments through which the cell elements in adjacent compartments are electrically connected. The interplate mats will preferably comprise glass microfibers such as are well known in the art for use in gas-recombinant batteries. One such glass mat material is commercially available in a variety of grades from the Hollingsworth & Vose Company under the trade name HOVOSORB ®. Compressible, resilient, fibrous mats made from materials other than glass (e.g., polyolefins) are also effective to immobilize the electrolyte and permit oxygen transport therethrough and accordingly may be substituted for glass. One such non-glass mat useful for this purpose comprises Dynel ® or polypropylene and is described in Corbin et al U.S. Pat. No. 3,553,020 assigned to the assignee of the present invention.

DETAILED DESCRIPTION OF SPECIFIC EMBODIMENTS OF THE INVENTION

The invention will better be understood when considered in the light of the following detailed description of certain specific embodiments thereof which is given hereafter in conjunction with the several drawings in which.

Figure 1:
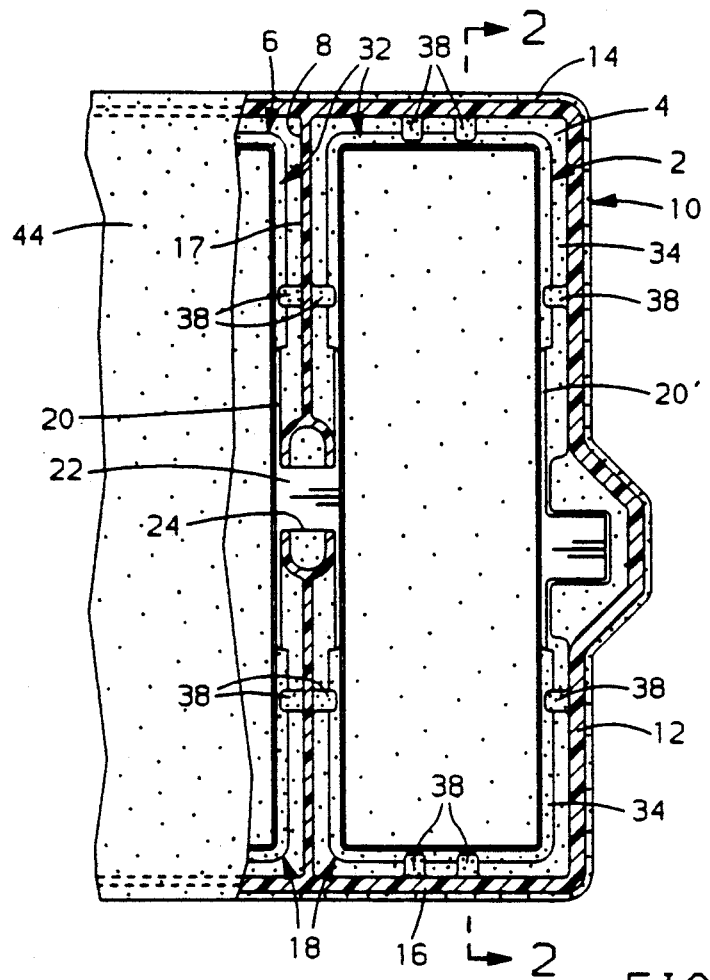
FIG. 1 is a partially sectioned plan view of a multicell, bipolar battery made in accordance with the present invention.
Figure 2:
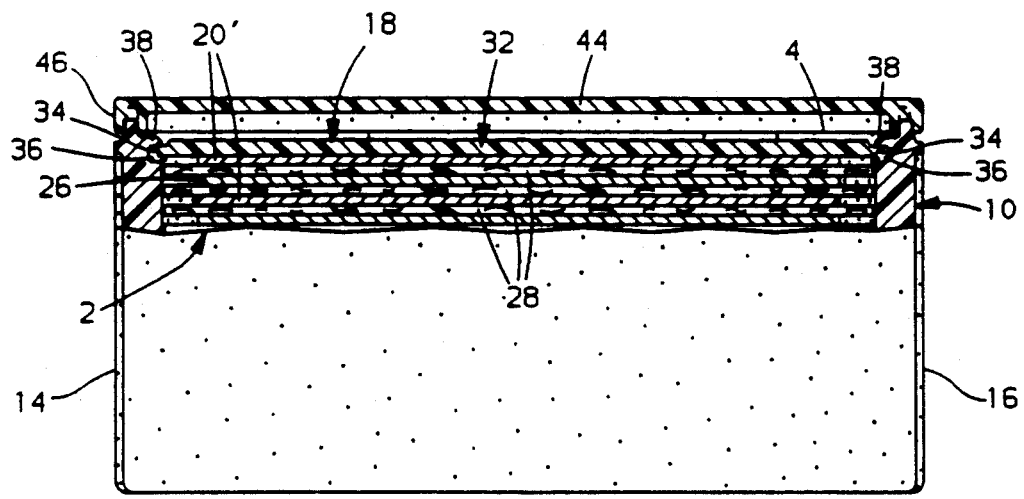
FIG. 2 is a sectioned view taken in the direction 2—2 of FIG. 1.
Figure 3:
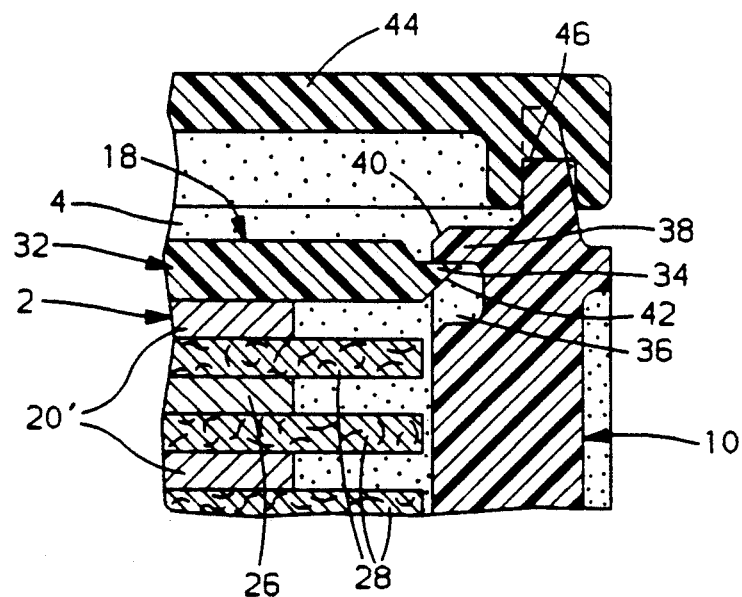
FIG. 3 is an enlarged view of the upper right hand corner of FIG. 2.
Figure 4:
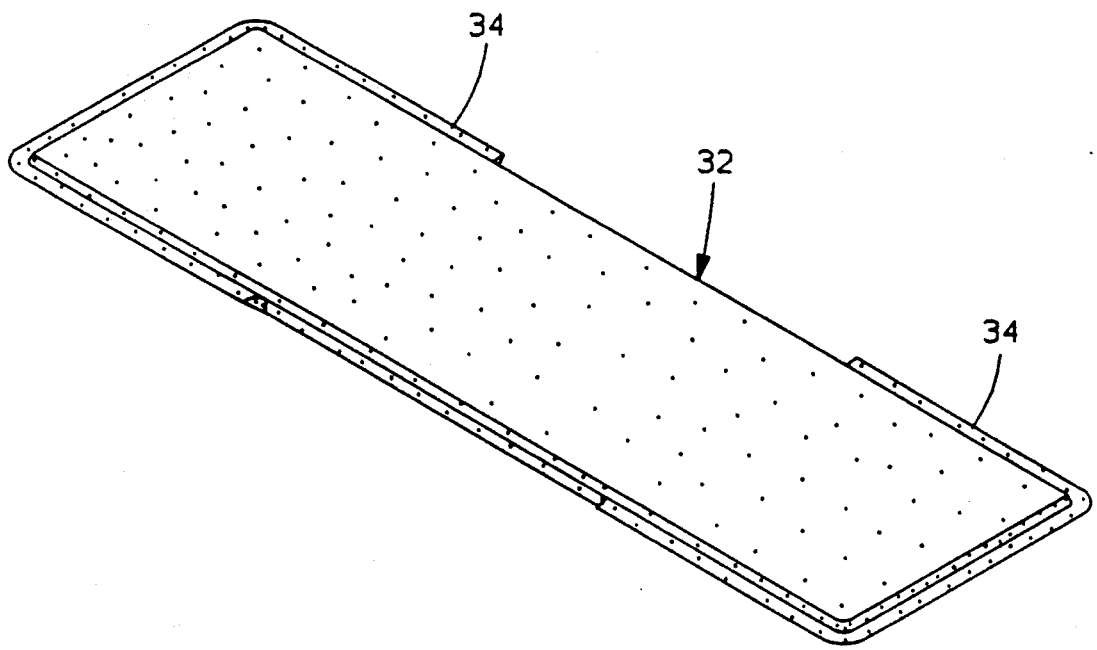
FIG. 4 is a perspective view of a retainer plate in accordance with one embodiment of the present invention.

FIGS. 1–4 illustrate one embodiment of the present invention in the context of a multicell, battery, of the side-by-side bipolar electrode type, having a first cell element 2 in one compartment 4 and a second cell element 6 in an adjacent compartment 8 of a thermoplastic container 10. The container 10 comprises an end wall 12, side walls 14 and 16 and intercell partition wall 17 separating the compartments 4 and 8 each from the other. Bipolar electrodes 18 comprise a negative polarity plate portion 20 and a positive polarity plate portion 20' each in separate compartments of the container 10 and electrically joined one to the other by an electrically conductive link 22 passing through opening 24 in the partition wall 17. The several bipolar electrodes are interleaved with similar bipolar electrodes (with associated negative and positive plates respectively) which are alternately oriented 180° to each other such that in each cell element (e.g., 2) the negative plate portion 26 of one bipolar electrode lies face-to-face with the positive plate portion (e.g., 20') of an adjacent bipolar electrode.

Between adjacent positive (e.g., 20') and negative (e.g., 26) electrodes in each cell element stack is a glass mat 28 which has been compressed into the container 10 during assembly. More specifically and in accordance with the present invention, a retainer plate 32 is placed atop the cell element 2 while it is uncompressed in the compartment 4. Pressure is then applied to the retainer plate 32 to compress the cell element 2 and pack it into the compartment 4. The retainer plate 32 is a substantially rigid acid resistant material (e.g., glass-filled polypropylene) and may have stiffening ribs (not shown) running the length thereof, if desired. Anchoring flanges 34 project from portions of the perimeter of the plate 32, and are adapted to engage recesses 36 in the walls of the container 10. In this particular embodiment, a plurality of recesses 36 are provided in the walls underlying overhanging tabs 38. Both the tabs 38 and the flange 34 are sufficiently flexible as to permit the plate 32 to be "snapped" into place by simply pushing down thereon until the anchoring flange(s) 34 snap into the recesses 36. Coacting beveled surface 40 on the tab 38 and beveled surface 42 on the flange 34 facilitate pushing the flanges 34 passed the tabs 38. The plate 32 thereafter holds the cell element 2 in the compartment under compression and prevents it from expanding upwardly against the cover 44 and dislodging it before the heat seal at the joint 46 has time to cool and solidify. Hence, the retainer plate 32 permits the battery to leave the heat sealing station quickly, before the joint has completely hardened, and without fear of dislodging the cover 44 from the container 10. As a result, the speed at which these batteries can be heat sealed is increased substantially.

Figure 5:
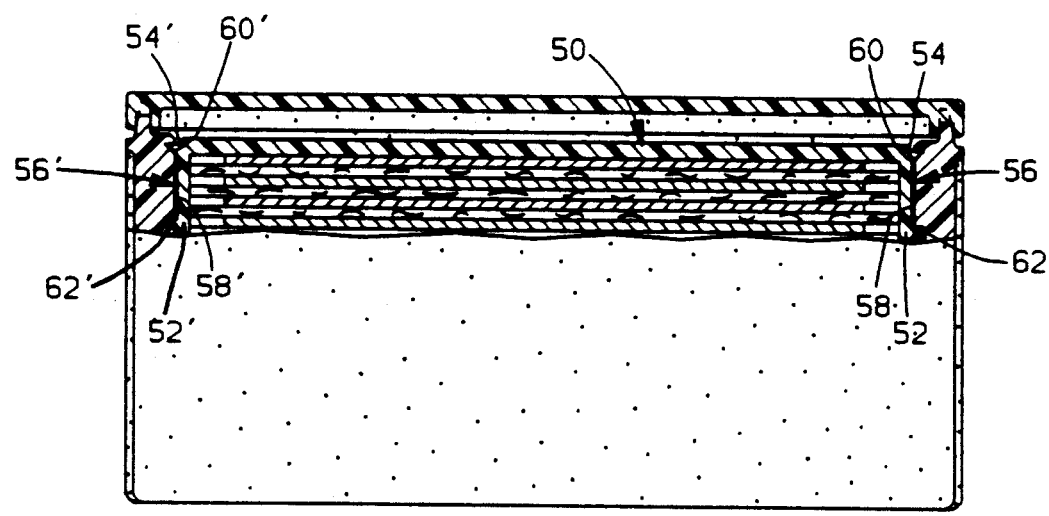
FIG. 5 is a view like that of FIG. 2, but of a different embodiment of the present invention.
Figure 6:
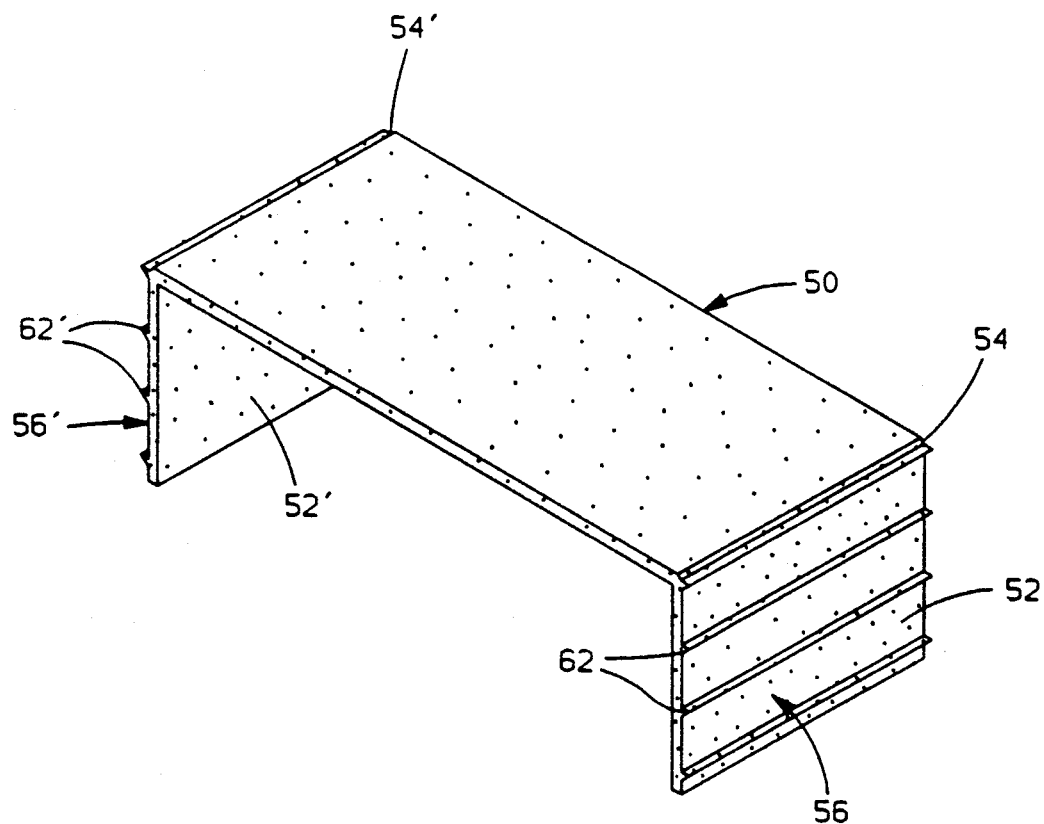
FIG. 6 is a perspective view of a retainer plate in accordance with another embodiment of the present invention.

FIGS. 5 and 6 depict another embodiment of the present invention wherein a substantially rigid retainer plate 50 has a pair of legs 52 and 52' extending substantially perpendicular thereto at the ends 54 and 54' thereof. The legs 52–52' have surfaces 56 and 56' which confront container side walls 58 and 58' each of which have elongated recesses 60 and 60, therein adapted to receive anchoring ribs 62 and 62, projecting from the surfaces 56 and 56' respectfully. A number of such elongated recesses may be provided to accommodate a similar number of ribs on each leg. The ribs 62–62' are sufficiently resilient to permit downward movement of the retainer into the compartment and engagement thereof with the recesses 60–60'while preventing it from being pushed out by the spring action of the compressed element.

Figure 7:
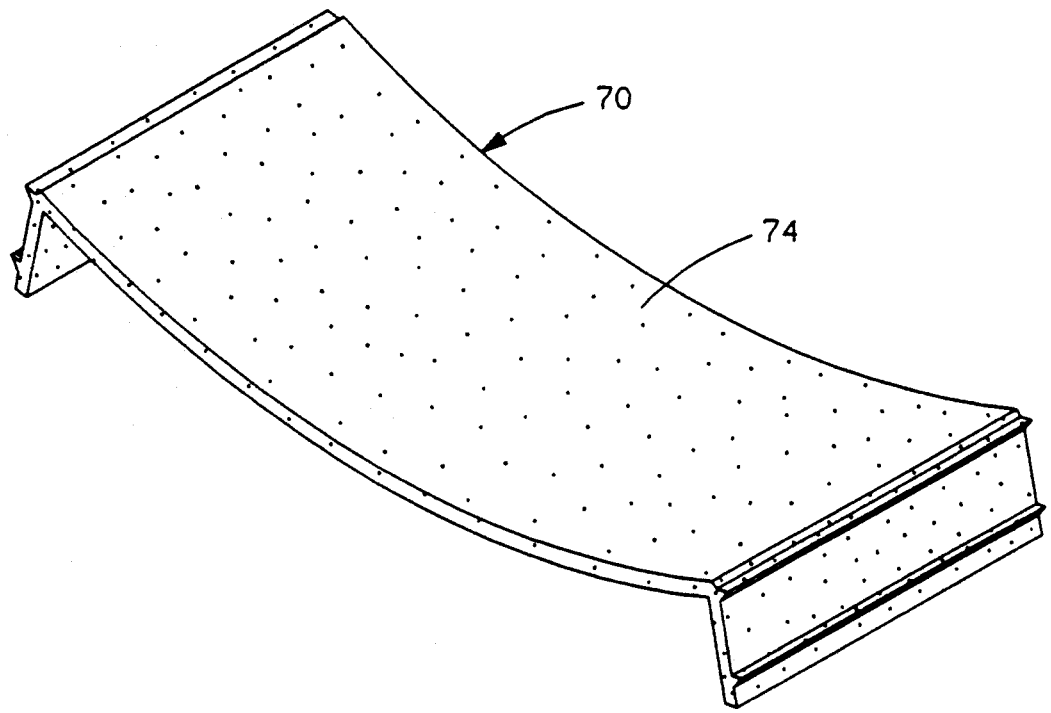
FIGS. 7 and 8 are perspective views of still other embodiments of the present invention.
Figure 8:
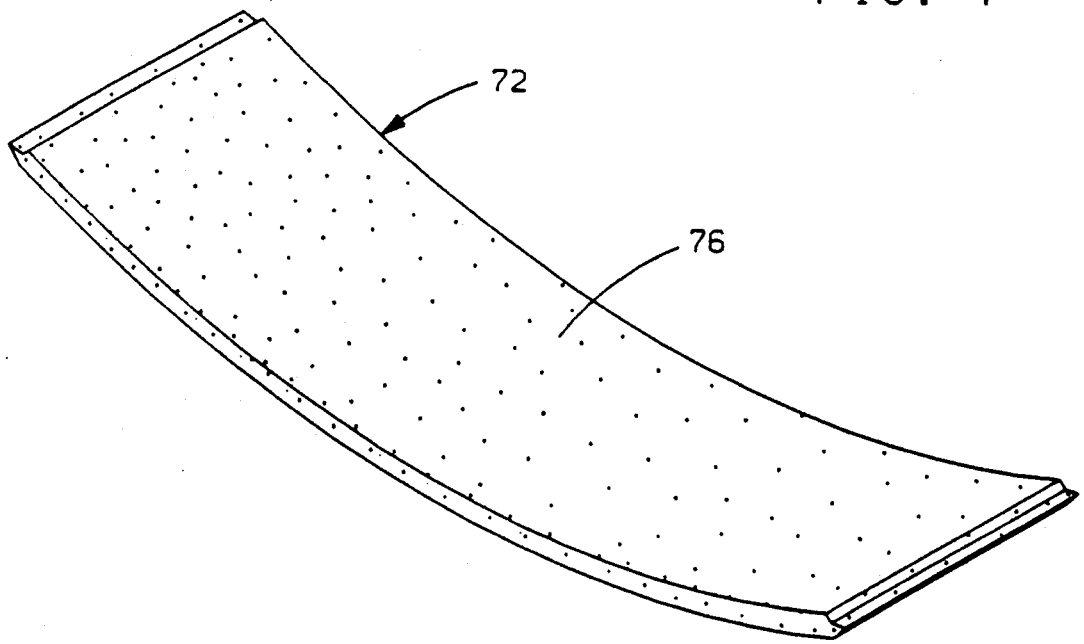

FIGS. 7 and 8 depict two additional embodiments of retainers in accordance with the present invention. These embodiments are similar to those described in conjunction with the other Figures except that the retainer plates 70 (in FIG. 7) and 72 are flexible and bowed at their centers 74 and 76 respectively prior to positioning in the container. The plates 70 and 72 are flattened during placement in the container and the spring action of the plates seeking to return to their bowed position resists the spring action of the compressed element seeking to expand in the compartment.

While the invention has been disclosed primarily in terms of specific embodiments thereof, it is not intended to be limited thereto but rather only to the extent set forth hereafter in the claims which follow.

The embodiments of the invention in which an exclusive property or privilege is claimed are defined as follows:

1. In an electric storage battery comprising a container having a plurality of walls defining at least one cell compartment, a galvanic cell element in said compartment said element comprising a stack of substantially planar positive and negative polarity plates alternately interleaved one with the other and separated one from the other by a resilient, fibrous, glass mat compressed between said plates in a direction normal to the principal planes of said plates, and a cover secured to said container and lying in a plane which is substantially parallel to said principal planes of said plates, the improvement comprising:

- a retainer plate in said compartment engaging one end of said stack adjacent said cover so as to maintain said glass mats under compression in said compartment and prevent deleterious expansion of said element outwardly against said cover;
- anchoring means operatively associated with said plate for engaging, and anchoring said retainer plate to, said walls; and
- recesses in said walls receiving said anchoring means and together therewith preventing displacement of said retainer plate in the direction of said cover as a result of pressure exerted thereagainst by said element incident to the tendency of said resilient glass mats to expand to an uncompressed state.

2. A battery according to claim 1 wherein said anchoring means is located on the perimeter of said plate.

3. A battery according to claim 1 wherein said plate includes a pair of legs extending from opposite ends thereof in a direction substantially perpendicular thereto, each of said legs having a surface confronting a said wall and having at least one anchoring rib projecting from said surface into a said recess.

4. A battery according to claim 3 wherein each said surface has a plurality of said ribs projecting therefrom into a plurality of said recesses.

5. A battery according to claim 1 wherein said plate is substantially rigid.

6. A battery according to claim 1 wherein said plate is flexible and, prior to placement in said compartment, is bowed at its center and said anchoring means are at opposite ends of said plate.

7. A battery according to claim 6 wherein said anchoring means comprises a pair of legs extending from opposite ends of said plate in a direction substantially perpendicular thereto, each of said legs having a surface confronting a said wall and having at least one anchoring rib projecting from said surface into a said recess.

8. In a multicell electric storage battery having a container comprising a plurality of walls defining a plurality of individual cell compartments each separated one from the next by one of said walls and housing a galvanic cell element comprising a stack of substantially planar positive and negative polarity plates alternately interleaved one with the other and separated one from the other by a resilient, fibrous, glass mat compressed between said plates in a direction normal to the principal planes of said plates, intercell connector means extending through said one wall for electrically series connecting adjacent cell elements together and comprising a plurality of electrically conductive links each joining a pair of substantially coplanar, opposite polarity plates into a bipolar electrode in which a positive polarity plate of a first cell element in one cell compartment is connected directly to a negative polarity plate in a second cell element in an adjacent cell compartment, and a cover for said container lying in a plane which is substantially parallel to said principal planes of said plates, the improvement comprising for each said compartment:

- a retainer plate engaging an end of said stack adjacent said cover so as to maintain said glass mats under compression in said compartment and prevent deleterious expansion of said element outwardly against said cover;
- anchoring means operatively associated with said plate for engaging, and anchoring said retainer plate to, said walls; and
- recesses in said walls receiving said anchoring means and together therewith preventing displacement of said retainer plate in the direction of said cover by pressure exerted thereagainst by said element incident to the tendency of said resilient glass mats to expand to an uncompressed state.

9. A battery according to claim 8 wherein said anchoring means comprises an edge of said plate.

10. A battery according to claim 8 wherein said plate includes a pair of legs extending therefrom in a direction substantially normal thereto, each said leg having a surface confronting a said wall and having at least one anchoring rib projecting from said surface into a said recess.

11. A battery according to claim 10 wherein each said surface has a plurality of said ribs projecting therefrom engaging a plurality of recesses in the wall confronting said surface.

12. A battery according to claim 8 wherein said plate is substantially rigid prior to placement in said compartment.

13. A battery according to claim 8 wherein said plate is flexible and bowed at its center prior to placement in the compartment, and said anchoring means is at opposite ends of said plate.

* * * * *